United States Patent
Isaksen et al.

(10) Patent No.: US 7,970,080 B1
(45) Date of Patent: Jun. 28, 2011

(54) MODES OF OPERATIONS IN QAM MODEMS USING HYSTERESIS SUB-STATES

(75) Inventors: David B. Isaksen, Mountain View, CA (US); Mark Fong, San Jose, CA (US)

(73) Assignee: Wideband Semiconductor, Inc., Mountain View, CA (US)

(*) Notice: Subject to any disclaimer, the term of this patent is extended or adjusted under 35 U.S.C. 154(b) by 247 days.

(21) Appl. No.: 12/319,773

(22) Filed: Jan. 12, 2009

Related U.S. Application Data

(60) Continuation-in-part of application No. 11/404,521, filed on Apr. 15, 2006, now Pat. No. 7,477,708, which is a division of application No. 10/734,415, filed on Dec. 11, 2003, now abandoned.

(51) Int. Cl.
*H03D 3/22* (2006.01)
*H04L 27/22* (2006.01)

(52) U.S. Cl. ........ 375/332; 375/229; 375/232; 375/233; 375/261

(58) Field of Classification Search .......... 375/229–236, 375/261–267, 222, 298, 326, 332, 345
See application file for complete search history.

(56) References Cited

U.S. PATENT DOCUMENTS

| | | | | |
|---|---|---|---|---|
| 6,115,433 | A | * | 9/2000 | de Lantremange ........... 375/326 |
| 6,150,978 | A | * | 11/2000 | McBurney ............... 342/357.04 |
| 6,278,741 | B1 | | 8/2001 | Danzer et al. |
| 6,510,188 | B1 | | 1/2003 | Isaksen et al. |
| 6,904,098 | B1 | | 6/2005 | Isaksen et al. |
| 7,079,605 | B1 | | 7/2006 | Isaksen et al. |
| 2002/0067764 | A1 | * | 6/2002 | Kindler et al. ................ 375/222 |
| 2004/0005022 | A1 | * | 1/2004 | Zhu et al. ..................... 375/365 |

* cited by examiner

*Primary Examiner* — Curtis B Odom
(74) *Attorney, Agent, or Firm* — Boris G. Tankhilevich

(57) ABSTRACT

A method of automated acquisition of a QAM signal is provided. The method employs a State machine progressing from an initial State to a final State. The State machine comprises: a symbol timing recovery loop; a carrier loop; a coarse frequency loop; and an equalizer. The method comprises: (A) Performing an automatic gain control (AGC) operation on an incoming QAM signal; (B) Performing a symbol timing recovery of an input QAM signal by adjusting a sampling clock of the symbol timing recovery loop; (C) Performing a Blind Equalization of the QAM signal without carrier lock; (D) Performing a carrier recovery of the QAM signal; and (E) Performing a decision directed equalization (DDE) of the QAM signal by updating a set of coefficients of the equalizer by using a decision based algorithm.

12 Claims, 9 Drawing Sheets

Sub States for Clock 1 (State = 2)

Sub States for Clock 2 (State = 3)

US 7,970,080 B1

MODES OF OPERATIONS IN QAM MODEMS USING HYSTERESIS SUB-STATES

This is a continuation-in-part of the U.S. patent application Ser. No. 11/404,521, entitled "MODES OF OPERATIONS IN QAM MODEMS", filed on Apr. 15, 2006 now U.S. Pat. No. 7,477,708, which is a divisional patent application for the parent patent application entitled "CONTROL ALGORITHM IN QAM MODEMS", Ser. No. 10/734,415, and filed on Dec. 11, 2003 now abandoned.

TECHNICAL FIELD

The present technology is in the field of QAM demodulators.

BACKGROUND

Typically, an external Digital Signal Processor (DSP) is used to perform a controlling function for a QAM modem. However, in order to perform a controlling function for the QAM modem externally, the external DSP controller has to sequentially pull all relevant processing data associated with the QAM modem control function from the QAM modem itself. Thus, it is a Master-Slave model, in which the DSP external controller is a Master device, and the QAM modem is a Slave device. The drawback to this Master-Slave model to control the QAM modem is a high latency of such QAM modem control due to insufficiently efficient physical interface of the external DSP (the Master device) with the QAM modem (the Slave device).

In addition, the prior art external DSP controller of a QAM modem makes the determination of whether a symbol loop of the QAM modem (or a carrier loop of the QAM modem) is locked by looking at all symbol loop parameters (or all carrier loop parameters respectively). This approach has a relatively high probability of a false lock.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of automated acquisition of a QAM signal is provided. The method employs a State machine progressing from an initial State to a final State. The State machine comprises: a symbol timing recovery loop; a carrier loop; a coarse frequency loop; and an equalizer.

The method comprises: (A) Performing an automatic gain control (AGC) operation on an incoming QAM signal to maintain a steady amplitude of the QAM signal; (B) Performing a symbol timing recovery of the input QAM signal by adjusting a sampling clock of the symbol timing recovery loop; (C) Performing a Blind Equalization of the QAM signal without carrier lock to minimize a dispersion error of the received QAM signal constellation as compared with an error-free QAM signal constellation by adjusting a set of coefficients of the equalizer; (D) Performing a carrier recovery of the QAM signal to eliminate a residual carrier frequency error and to eliminate a phase error from the acquired QAM signal; and (E) Performing a decision directed equalization (DDE) of the QAM signal by updating a set of coefficients of the equalizer by using a decision based algorithm.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
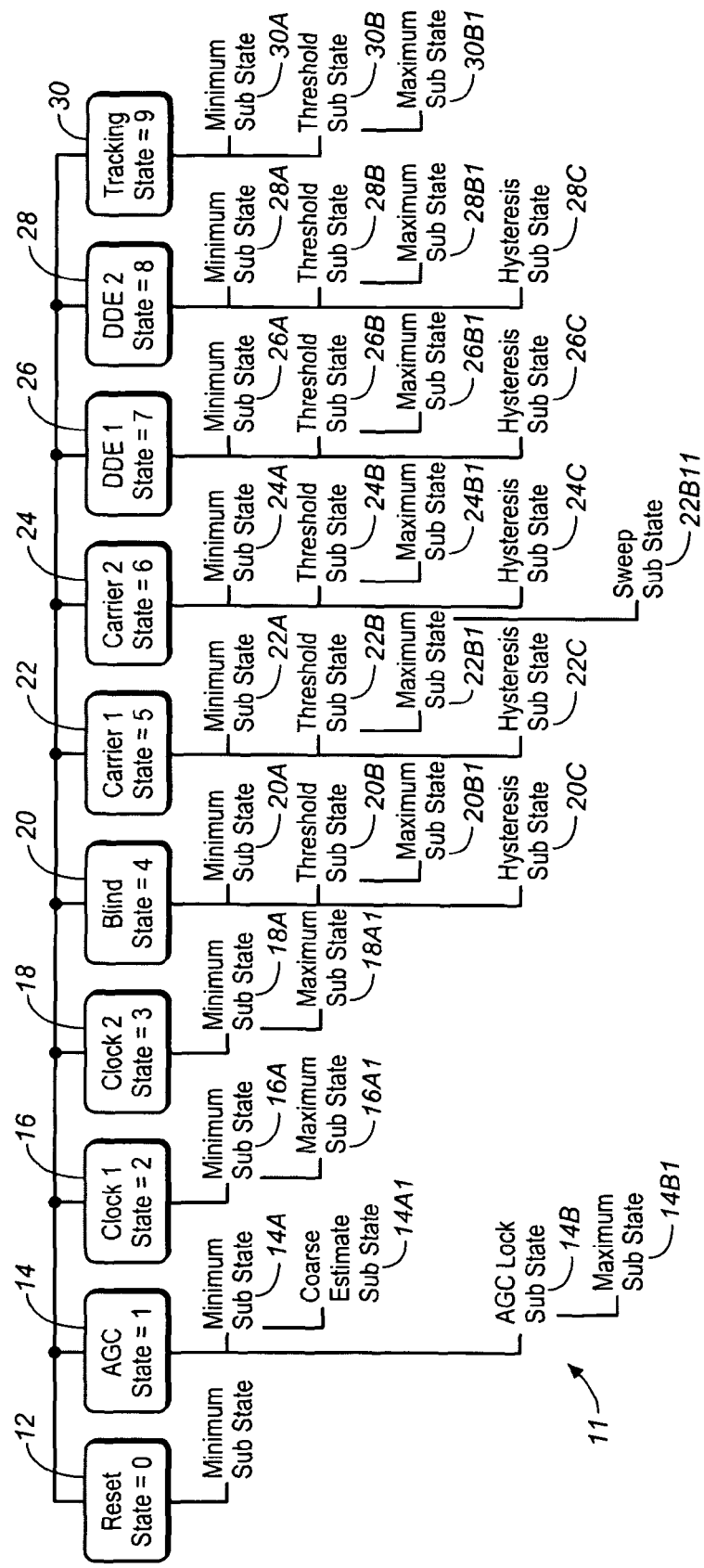
FIG. 1 is a topological diagram of a State machine having 10 States with all sub-States from an initial State "1" to a final State "9" including the reset State "0".

In an embodiment of the technology, FIG. 1 represents a topological diagram 10 that depicts a State machine 11 having 10 States 12 through 30 that is embedded in the modem and that is utilized to implement the method of the present technology of automatic acquisition of an incoming signal by progressing from an initial State "1" 14 to a final State "9" 30. State "0" 12 is a reset State and will be discussed below.

In an embodiment of the present technology, the modem comprises a QAM modem. In another embodiment, the modem comprises a QPSK modem. In one more embodiment, the modem comprises a Phase Shift Key (PSK) modem.

The modem's input signal is a digital signal stream from a digital source or channel encoder. If the modem's input signal is generated by an analog information source, the signal should be first band limited to a bandwidth of B in a low pass filter (LPF) block, before sampling can take place in an analog to digital converter (ADC) block. According to Nyquist's fundamental theorem, the sampling frequency should be equal to or higher than twice the bandwidth B, that is $f_c \geq 2B$. If this condition is met, the original bandlimited signal can be recovered from its (1/2B)-spaced sampled representation with the aid of a low-pass filter having a cut-off frequency of B. The analog to digital converter (ADC) takes the bandlimited signal and digitizes it by converting the analog level of each sample to a discrete level. The mapping process that maps the input information bits from the digital source onto the in-phase (I) and quadrature (Q) carriers determines the properties of the modem. The mapping can be represented by the so-called constellation diagram. Due to the instantaneous transitions in the time domain the I-sequence has an infinite bandwidth and would require an infinite channel bandwidth for its transmission. The same is true for the Q-component. Thus, the I and Q signals are bandlimited before transmission in order to contain the spectrum within a limited band and to minimize interference with other users or systems sharing the spectrum. An ideal linear-phase low pass filter with a cut-off Nyquist frequency of $f_N=f_S/2$, wherein $f_S=1/T$ is the signaling frequency, and wherein T is the signaling interval duration, would retain all the information conveyed by the quadrature components I and Q within a compact frequency band. Due to the linear phase response of the filter all frequency components would exhibit the same group delay. Because such a filter has a sinc function shaped impulse response with equidistant zero-crossings at the sampling instants, it does not result in inter-symbol-interference (ISI). Once the analog I and Q signals have been generated and filtered, they are modulated by an I-Q modulator This process allows both I and Q signals to be transmitted over a single channel within the same bandwidth using quadrature carriers. The I and Q signals are combined and the combined signal is modulated by a radio frequency in the RF mixer, so that the resulting signal has a carrier frequency suitable for the transmission over the channel. The RF demodulator mixes the received signal down to the IF for the I-Q demodulator, wherein the recovered IF spectrum is similar to the transmitted one but with the additive noise floor. The I-Q demodulation takes place in the reverse order to the I-Q modulation process. The signal is split into two paths, with each path being mixed down with IF's that are 90 degrees apart. The recovered I component should be near identical to that transmitted, with the only difference being caused by noise. Once the analog I and Q components have been recovered, they are digitized by the bit detector in the DEMAP block. The bit detector determines the most likely bit (MLB) transmitted by sampling the I and Q signals at the correct sampling instants and compares them to the legitimate I and Q values. The recovered bits are passed to the DAC. If the channel's SNR is high enough, the reconstructed digital signal is identical to the original input signal. Provided the DAC operates at the same frequency and with the same number of bits as the input ADC, the analog output signal after low pass filtering with a cut-off frequency of B in block LPF, is a close replica of the input signal. The right time to sample is a function of the clock frequency at the transmitter. The data clock should be regenerated upon recovery of the carrier. Any error in the clock recovery will increase the BER. Both clock and carrier recovery systems attempt to derive information about timing from the received signal. While carrier recovery is only necessary in a coherent demodulation system, clock recovery is required in all schemes, and accurate clock recovery is essential for reliable data transmission. Clock recovery attempts to synchronize the receiver clock with the baseband symbol rate transmitter clock, wherein carrier recovery endeavors to align the receiver local oscillator with the transmitted carrier frequency. The above-given prior art introduction to the QAM modems can be found in "Modem Quadrature Amplitude Modulation", by W. T. Webb and L. Hanzo, published by Pentech Press Limited in 1994, in Great Britain.

Referring still to FIG. 1, in an embodiment of the present technology, the modem comprises the QAM modem, and the embedded controller is configured to control the QAM modem according to the control algorithm by using the State machine 11. In general, the QAM modem acquires and tracks a signal through an automatic acquisition operation. As was stated above, there are 10 States that define the acquisition operation. Each operating State is defined by control parameters that determine how long to remain in the current operating State and when control is passed to the next State. These control parameters are defined by the user through the host interface. The control parameters are defined for each of the 10 States. The modem selects each parameter based on its current operating State. The signal is characterized and conditioned through each State until the final idle State "9" achieved. In the event of the loss of signal, the modem reacquires the signal by cycling back to State "0".

In an embodiment of the present technology, the method of an automated acquisition of a QAM signal is performed by the State machine 11 that uses the control algorithm comprising at least the following steps:

(A) Performing an automatic gain control (AGC) operation on an incoming QAM signal to maintain steady amplitude of the QAM signal;

(B) Performing a symbol timing recovery of the input QAM signal by adjusting a sampling clock of the symbol timing recovery loop;

(C) Performing a Blind Equalization of the QAM signal without carrier lock to minimize a dispersion error of the received QAM signal constellation as compared with an error-free QAM signal constellation by adjusting a set of coefficients of the equalizer;

(D) Performing a carrier recovery of the QAM signal to eliminate a residual carrier frequency error and to eliminate a phase error from the acquired QAM signal; and (E) Performing a decision directed equalization (DDE) of the QAM signal by updating a set of coefficients of the equalizer by using a decision based algorithm.

In an embodiment of the present technology, the State machine 11 performs the step (A) of an automatic gain control (AGC) operation on an incoming QAM signal to maintain a steady amplitude of the QAM signal while being in State "1" 14.

In the U.S. Pat. No. 6,510,188, entitled "ALL DIGITAL AUTOMATIC GAIN CONTROL CIRCUIT" by Isaksen et al., a digital automatic gain control (AGC) system is fully disclosed. The AGS system, of '188 patent comprises an AGC amplifier configured to scale an input signal by a scale factor, and configured to generate an analog scaled input signal. An analog-to-digital (A/D) converter is configured to sample and convert the analog scaled input signal into a digital scaled input signal. The frequency down converted digital scaled input signal is processed by a power level detector circuit to detect its power level. The logarithmic comparison circuit (LCC) is configured to compare the detected power level of the digital scaled input signal to a predetermined reference signal and configured to generate a digital error signal. Finally, an error processing circuit is configured to process the digital error signal and configured to determine the scale factor of the AGC circuit. The test results show that for any applicable QAM constellation the AGC circuit of the present technology can control the broadest fades (or decreases) in the power level of the input signal with accuracy up to 200 dB/per second. The '188 patent is assigned to the assignee of the present patent application and is incorporated herein in its entirety. The "188 patent provides an enabling disclosure for the AGC operation performed by the State machine 11 in step (A).

Briefly, during this State "1", the power at the output of the Nyquist filter is computed, averaged and compared to a target level that represents the average power in the constellation. The error between the average power in the constellation and the target power level is output to the AGC DAC port to maintain steady signal amplitude. Optionally for this State, a coarse frequency measurement can be performed. This measurement is performed so that corrections can be applied to frequency offsets that occur due to a drift in frequency over a long period of time.

More specifically, referring still to FIG. 1, in an embodiment of the present technology, the State machine 11 enters the sub-State 14B—AGC Lock Sub State to perform the step of automatic gain control (AGC) operation. In this embodiment, the step of performing the automatic gain control (AGC) operation further comprises the step of computing, averaging and comparing to a target level an output power at Nyquist filter. The output power represents the average power in the QAM signal constellation, wherein an error signal between the average power in the QAM signal constellation and the output target power level is used to maintain steady QAM signal amplitude. In this embodiment, the State machine 11 further enters the sub-State 14B1—Maximum Sub-State.

In another embodiment of the present technology, the State machine 11 enters the sub-State 14A Minimum Sub-State to perform the step of the automatic gain control (AGC) operation. In this embodiment, the State machine 11 further enters the sub-State 14A1—Coarse Estimation Sub-State—to perform the step of automatic gain control (AGC) operation. In this sub-State further comprises the coarse frequency estimation of the QAM signal frequency drift over a long period of time is performed to obtain a set of frequency corrections, and further to apply the set of frequency corrections to a set of frequency offsets in the coarse frequency loop. The QAM signal frequency drifts over a long period of time due to effects of aging, temperature changes, humidity changes, etc.

The coarse frequency estimate is optional and is selected by the user through the host interface. The 3 parameters entered by the user for the coarse frequency estimate are as follows: coarse estimate enable flag, coarse estimate count, and coarse symbol count. If the coarse estimate enable flag is set, the coarse estimate is performed. The coarse estimate begins by averaging the input symbols through the front end tuner. The number of symbols to average is determined by the coarse estimate symbol count. This process continues until the threshold number of coarse estimates is exceeded.

Figure 2:
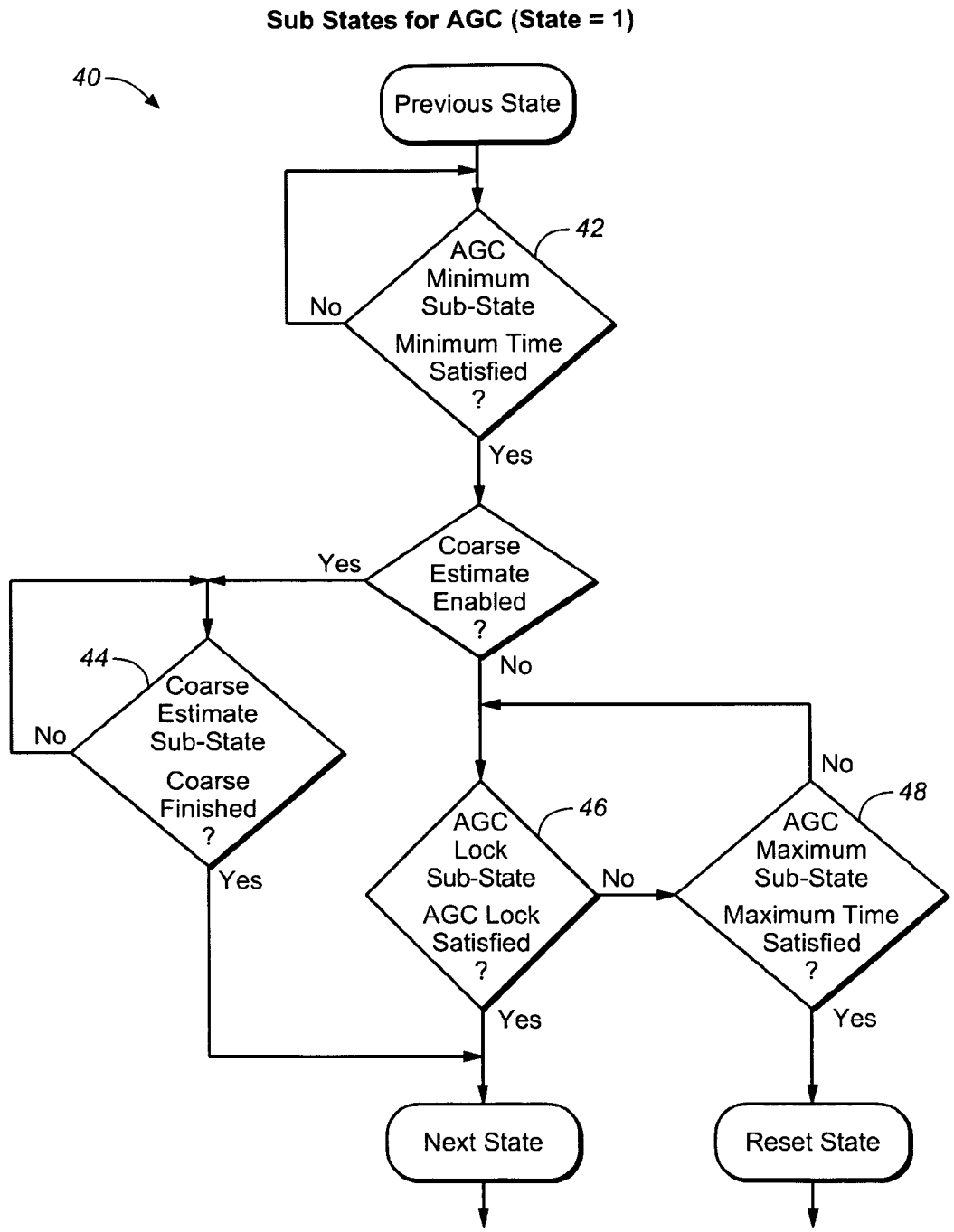
FIG. 2 illustrates four loop tests for the State "1" of FIG. 1.

More specifically, as shown in FIG. 2, in an embodiment of the present technology, the State machine 11 in State "1" performs the following loop tests:

The loop test 42 for AGC minimum Sub-State 14A (of FIG. 1):
   Is minimum time satisfied?
The loop test 44 for AGC Coarse Estimation Sub-State 14A1 (of FIG. 1):
   Is Coarse Finished?
The loop test 46 for the AGC Lock Sub-State 14B (of FIG. 1):
   Is AGC Lock Satisfied?
The loop test 48 for the AGC Maximum Sub-State 14B1 (of FIG. 1):
   Is maximum time satisfied?

The next step is the step (B) of performing a symbol timing recovery of the input QAM signal by adjusting a sampling clock of the symbol timing recovery loop.

In the U.S. Pat. No. 6,278,741, entitled "TIMING RECOVERY CIRCUIT IN QAM MODEMS" by David Isaksen et al., a timing recovery system and method for QAM signals having different symbol rates are disclosed. After sampling the QAM baseband signal, a symbol timing recovery logic including a generator of a weighting function is utilized to develop a local error signal. The local error signal averaged over a predetermined time period is utilized to make a global decision regarding the sampling point position relative to the baseband signal maximum/minimum. The patent '741 is incorporated by reference herein and is assigned to the assignee of the present patent application. The '741 patent provides the enabling disclosure of the process of the symbol timing recovery used in the step (B) by the control algorithm of the present technology.

In an embodiment of the present technology, the State machine 11 enters the Minimum Sub-State 16A (of FIG. 1) to perform the step of symbol timing recovery of the input QAM signal. Briefly, in this Minimum Sub-State 16A the symbol loop process adjusts the sampling clock or the interpolated sample to the ideal sample point. The symbol loop is adjusted by frequency and phase coefficients defined by the user through the host interface. In an embodiment of the present technology, the State machine 11 further enters the Maximum Sub-State 16A1 (of FIG. 1) to perform the step of symbol timing recovery of the input QAM signal by adjusting the sampling clock of the symbol timing recovery loop (see '741 patent).

Figure 3:
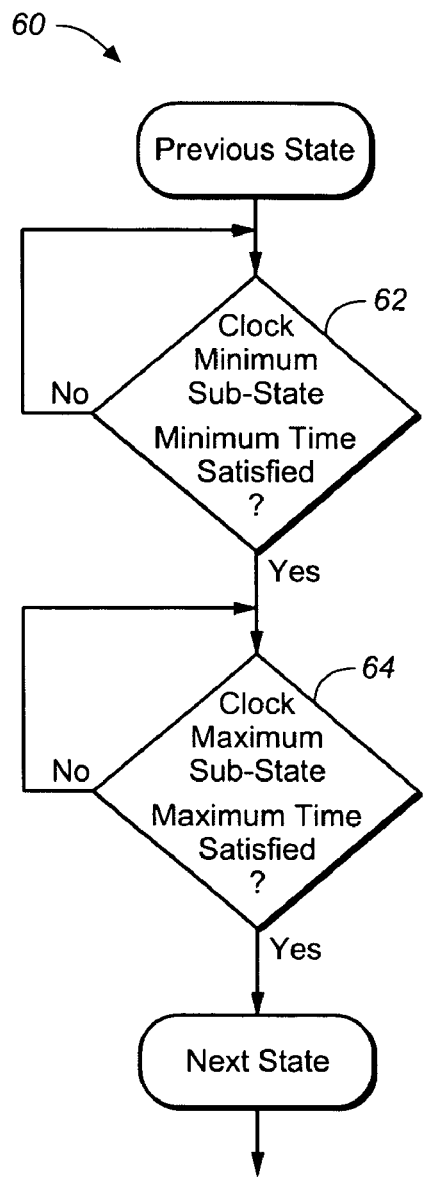
FIG. 3 depicts two loop tests for the State "2" of FIG. 1.

As shown in FIG. 3, the State "2" (16 of FIG. 1) comprise two loop tests:

The loop test 62 for the Clock Minimum Sub-State 16A (of FIG. 1):
   Is minimum time satisfied?
The loop test 64 for the Clock Maximum Sub-State 16A1 (of FIG. 1):
   Is maximum time satisfied?

In an embodiment of the present technology, the State machine 11 enters the State "3" 18 (of FIG. 1) in order to optimize the symbol timing recovery of the input QAM signal.

Briefly, during this State "3" the symbol timing recovery is continued. The symbol loop process is the same as for State "2", however, the symbol loop can be readjusted for this State for further refinement.

In an embodiment of the present technology, the State machine 11 enters the State "3" (of FIG. 1) in order to perform symbol timing recovery of the input QAM signal by re-adjusting the sampling clock of the symbol timing recovery loop to optimize the symbol timing recovery of the input QAM signal.

In an embodiment of the present technology, the State machine 11 enters the State Minimum Sub-State 18A (of FIG. 1) in order to perform symbol timing recovery of the input QAM signal by adjusting the set of frequency coefficients.

In another embodiment of the present technology, the State machine 11 enters the State Maximum Sub-State 18A1 (of FIG. 1) in order to perform symbol timing recovery of the input QAM signal by adjusting the set of phase coefficients of the symbol loop via a host interface, according to '741 patent.

Figure 4:
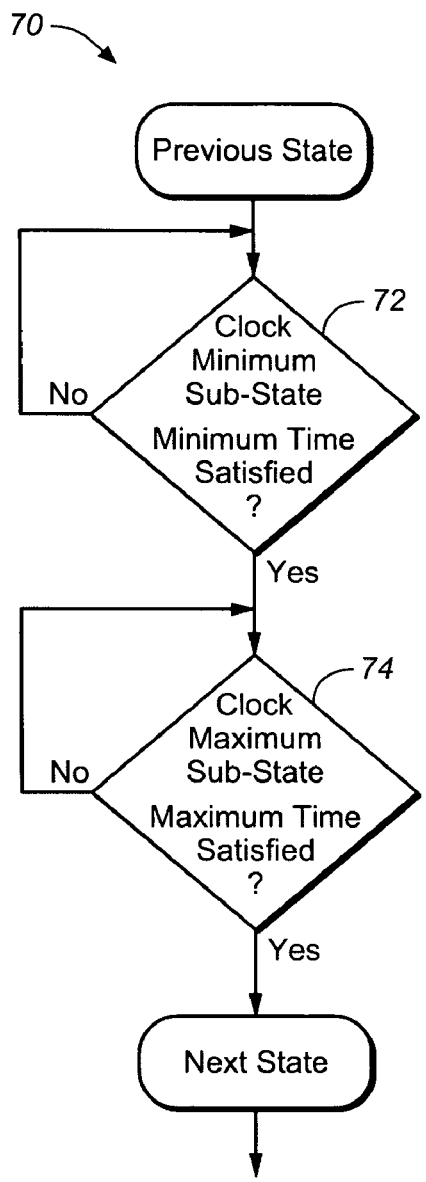
FIG. 4 shows two loop tests for the State "3" of FIG. 1.

As shown in FIG. 4, the State "3" (18 of FIG. 1) comprise two loop tests:

The loop test 72 for the Clock Minimum Sub-State 18A (of FIG. 1):
   Is minimum time satisfied?
The loop test 74 for the Clock Maximum Sub-State 18A1 (of FIG. 1):
   Is maximum time satisfied?

In an embodiment of the present technology, at the next step (C), the control algorithm is configured to perform a Blind Equalization operation on QAM signal without carrier lock to minimize a dispersion error of the received QAM signal constellation (as compared with an error-free QAM signal constellation) by adjusting a set of coefficients of the equalizer.

The process of Blind Equalization of the QAM signal without carrier lock is fully disclosed in the U.S. Pat. No. 7,079,605, "FREQUENCY ESTIMATION BASED ON CONSTELLATION ERROR IN QAM MODEMS", issued on Jul. 18, 2006. This patent is incorporated herein in its entirety and is assigned to the assignee of the present Patent application. The method for frequency estimation in a QAM modem according to the patent '605 comprises the following steps: (1) receiving in phase and quadrature components of a QAM symbol from a carrier recovery block; (2) mapping received QAM symbol to a nearest QAM plant point using a slicer; (3) determining an instant error power of the received QAM point; (4) averaging the instant error power over a plurality of incoming QAM symbols in time domain; (5) excluding a DC component from the averaged error power; (6) translating the averaged error power without DC component from time domain into a frequency domain in order to determine the frequency spectrum of the averaged error power; (7) selecting the frequency spectrum component of the averaged error power with the maximum amplitude by using a peak detection; and (8) determining the frequency offset as the maximum frequency spectrum component of the averaged error power.

In an embodiment of the present technology, the State machine 11 (of FIG. 1) enters the State "4" 20 to perform the step of Blind Equalization of the QAM signal without carrier lock. Briefly, the State machine 11 performs the process of Blind Equalization by adapting the equalizer coefficients without carrier lock so that the dispersion error is minimized. The equalizer performs a constant modulus update of the coefficients.

More specifically, in this embodiment of the present technology, the step of performing the Blind Equalization of the QAM signal without carrier lock further comprises the step of substantially continuously performing a modulus update of the set of equalizer coefficients. This step is fully described in the referred above patent '605.

The Blind State "4" (20 of FIG. 1) comprises four Sub-States: Minimum Sub-State 20A, Threshold Sub-State 20B including Maximum Sub-State 20B1, and Hysteresis Sub-State 20C.

Figure 5:
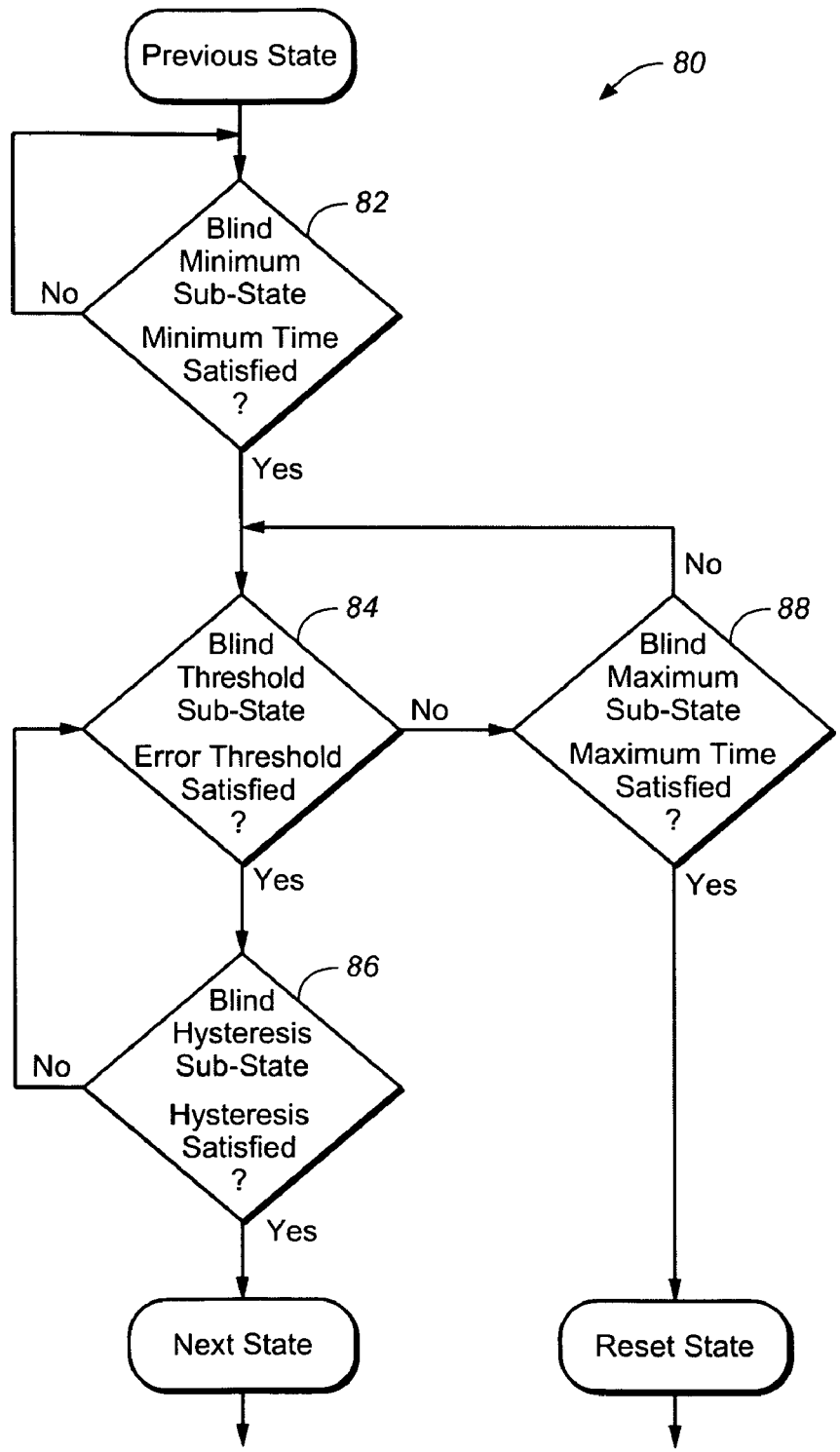
FIG. 5 illustrates four loop tests for the State "4" of FIG. 1.

As shown in FIG. 5, the State "4" (20 of FIG. 1) comprise four loop tests:
  The loop test 82 for the Blind Minimum Sub-State 20A (of FIG. 1):
    Is minimum time satisfied?
  The loop test 84 for the Blind Threshold Sub-State 20B (of FIG. 1):
    Is error threshold satisfied?
  The loop test 86 for the Blind Hysteresis Sub-State 20C (of FIG. 1):
    Is hysteresis satisfied?
  The loop test 88 for the Blind Maximum Sub-State 20B1 (of FIG. 1):
    Is maximum time satisfied?

In an embodiment of the present technology, in the hysteresis sub-State the State machine of the present technology utilizes the dwell count to further determine the State to State transition. A dwell count is maintained and incremented for every symbol beyond the minimum symbol count. The dwell count is reset to zero before transitioning to the next State. The dwell count is compared to the dwell count limit defined by the user. The dwell count limit is unique to each State. For example, if the minimum count is met and the error threshold is met, a State transition between sub-States 20B and 20C occurs if the dwell count exceeds the dwell count limit.

In an embodiment of the present technology, at the next step (D), the control algorithm performs a carrier recovery of the QAM signal to eliminate a residual carrier frequency error and to eliminate a phase error from the acquired QAM signal.

The process of carrier recovery of the QAM signal to eliminate a residual carrier frequency error and to eliminate a phase error from the acquired QAM signal is fully disclosed in the U.S. Pat. No. 6,904,098, "LINEAR PHASE ROBUST CARRIER RECOVERY FOR QAM MODEMS" issued on Jun. 7, 2005. This patent is incorporated in its entirety and is assigned to the assignee of the present Patent application. According to patent '098 a method of carrier tracking for a QAM demodulator including an adaptive equalizer comprises the following steps: (A) sampling a QAM signal received from a transmission channel; (B) recovering a symbol clock function from the sampled QAM signal; (C) applying the sampled QAM signal to the adaptive equalizer in order to obtain a QAM equalized signal in a Blind Equalization (BE) mode; (D) using a slicer to locate a nearest plant point for the QAM Blind equalized signal for each recovered symbol clock; (E) using a complex conjugate multiplier to obtain an instantaneous in phase component and an instantaneous quadrature component of a phase angle error signal; (F) using a linear phase detector to obtain an instantaneous phase angle error for each symbol clock; (G) averaging the instantaneous phase angle error signal by using a carrier loop filter; (H) using a complex multiplier to insert an inverse of the averaged phase angle error signal into the QAM Blind equalized signal to compensate for the carrier phase angle error; and (I) repeating the steps (D-H) to close a carrier frequency loop.

Patent '098 provides the enabling disclosure of the process of a carrier recovery of the QAM signal to eliminate a residual carrier frequency error and to eliminate a phase error from the acquired QAM signal. This process is used by the control algorithm of the present technology.

In an embodiment of the present technology, the State machine 11 of FIG. 1, enters the State "5" 22 to perform the Carrier Acquisition 1. Briefly, during this State "5" the carrier recovery is continued. The carrier loop process eliminates the residual carrier frequency and phase error from the signal. The carrier loop is adjusted by frequency and phase coefficients defined by the user through the host interface. Optionally for this State, a frequency sweep can be performed. The frequency sweep is used if the frequency offset of the signal is greater than the acquisition bandwidth of the carrier recovery loop.

Figure 6:
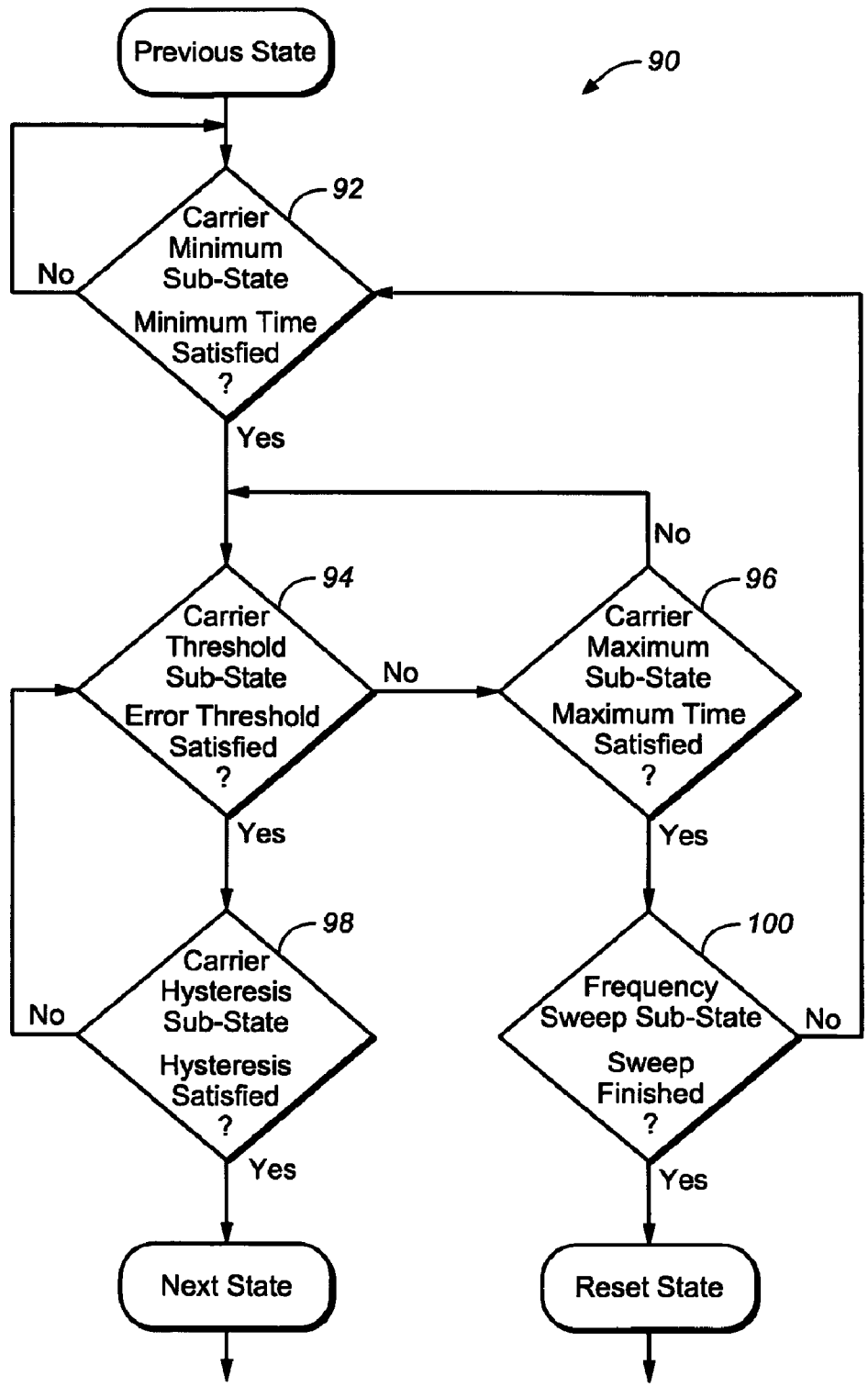
FIG. 6 depicts five loop tests for the State "5" of FIG. 1.

As shown in FIG. 6, the State "5" comprises five loop tests:
  The loop test 92 for Carrier Minimum Sub-State 22A:
    Is minimum time satisfied?
  The loop test 94 for Carrier Threshold Sub-State 22B:
    Is error threshold satisfied?
  The loop test 96 for Carrier Maximum Sub-State 22B1:
    Is minimum time satisfied?
  The loop test 100 for Frequency Sweep Sub-State 22B11:
    Is sweep finished?
  The loop test 98 for Hysteresis Sub-State 22C:
    Is hysteresis satisfied?

In an embodiment of the present technology, after blind equalization is performed in State "4", the carrier acquisition (in State "5") operates with all the parameters above and optionally with a frequency sweep (loop test 100). The frequency sweep uses 4 parameters for its operation. A frequency sweep enable flag, a frequency sweep delta, and an upper and lower frequency sweep limit is defined by the user and are only used in State "5". Also within State "5", a sweep frequency is maintained and outputted to the carrier loop. The sweep frequency is initially set to the lower frequency sweep limit in State "4". The frequency sweep only takes effect if the maximum symbol count is exceeded. If the maximum symbol count is exceeded and the frequency sweep enable flag is set, the sweep frequency is updated by adding the sweep delta. This process continues until either the error threshold is met or the upper sweep frequency limit is exceeded. If the upper sweep frequency limit is exceeded, the State transitions back to State "0" (12 of FIG. 1).

In an embodiment of the present technology, the State machine 11 of FIG. 1, enters the State "6" 24 (of FIG. 1) to perform the Carrier Acquisition 2. Briefly, during this State "6" the carrier recovery is performed. The carrier loop process is the same as for State 5 except for the frequency sweep. The carrier loop can be readjusted for this State for further refinement.

More specifically, in an embodiment of the present technology, the step of performing the carrier recovery of the QAM signal while the State machine stays in the State "6" 24 further comprises the step of re-adjusting the set of frequency coefficients and the set of phase coefficients of the carrier loop to optimize the carrier acquisition of the QAM signal. The full disclosure is given in patent '098.

Figure 7:
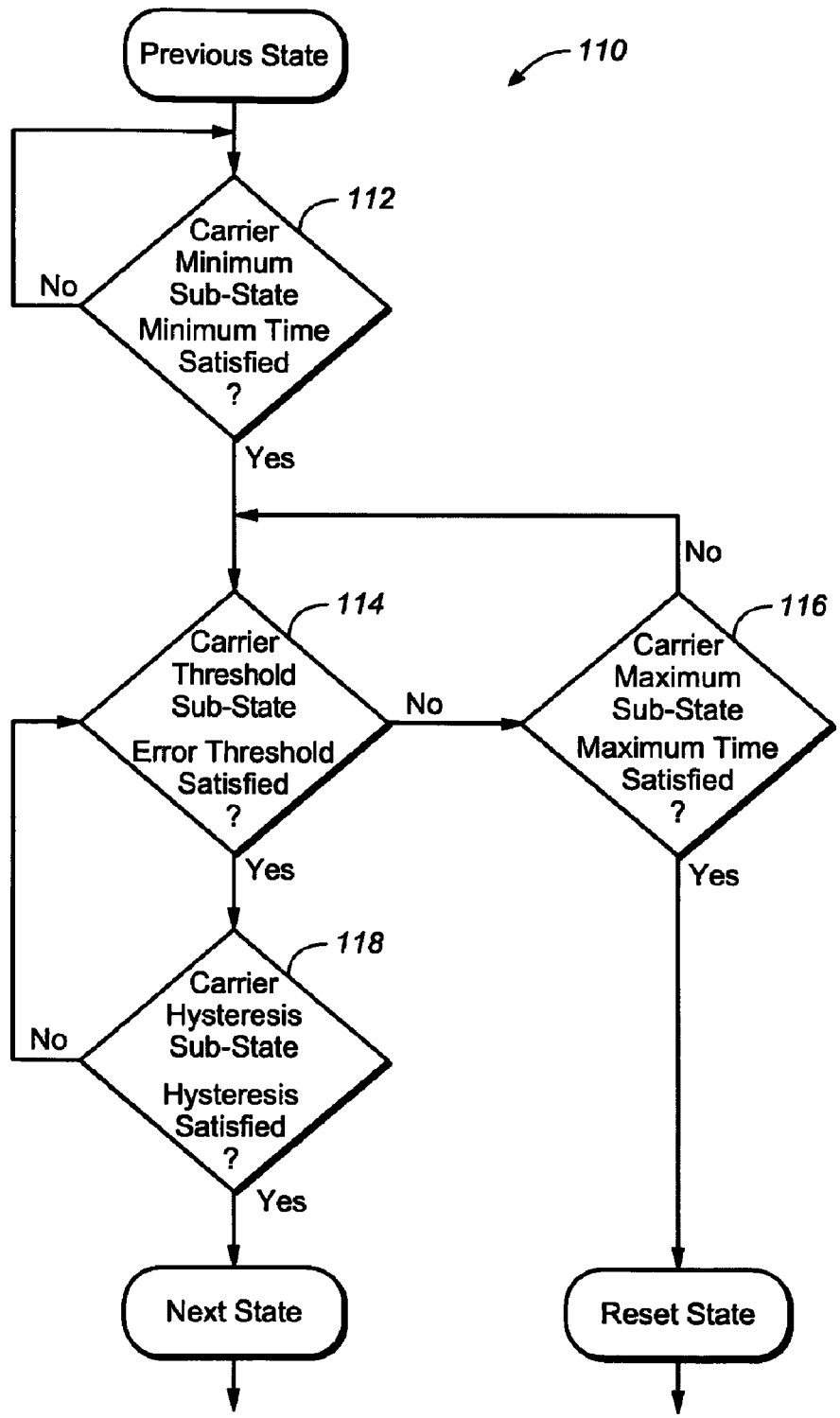
FIG. 7 illustrates four loop tests for the State "6" of FIG. 1.

As shown in FIG. 7, the State "6" (24 of FIG. 1) comprises four loop tests:
- The loop test 112 for the Carrier Minimum Sub-State 24A (of FIG. 1):
  - Is minimum time satisfied?
- The loop test 114 for the Carrier Threshold Sub-State 24B (of FIG. 1):
  - Is error threshold satisfied?
- The loop test 116 for the Carrier Maximum Sub-State 24B1 (of FIG. 1):
  - Is maximum time satisfied?
- The loop test 118 for the Carrier Hysteresis Sub-State 24C (of FIG. 1):
  - Is hysteresis satisfied?

Finally, in an embodiment of the present technology, the control algorithm performs the step (E) of decision directed equalization (DDE) of the QAM signal by updating a set of coefficients of the equalizer and by using a decision based algorithm.

The method to perform the step of decision directed equalization (DDE) of the QAM signal by updating a set of coefficients of the equalizer and by using a decision based algorithm is fully disclosed in the referred above patent '098.

In an embodiment of the present technology, the step (E) of performing the decision directed equalization (DDE) of the QAM signal causes the State machine to enter State "7" 26 (of FIG. 1) to perform the step of decision directed equalization (DDE) of the QAM signal. Briefly, during this State "7" the decision directed equalization is performed. The equalizer coefficients are updated by using a decision directed (DDE) algorithm. The decision directed algorithm (DDE) uses a step size coefficient to determine the error feedback from the carrier loop to the equalizer.

More specifically, in this embodiment, the step of decision directed equalization (DDE) of the QAM signal while the State machine stays in State "7" further comprises the step of using a step size coefficient in the DDE algorithm to determine the error feedback from the carrier loop to the equalizer. This step is fully disclosed in the referred above patent '098.

Figure 8:
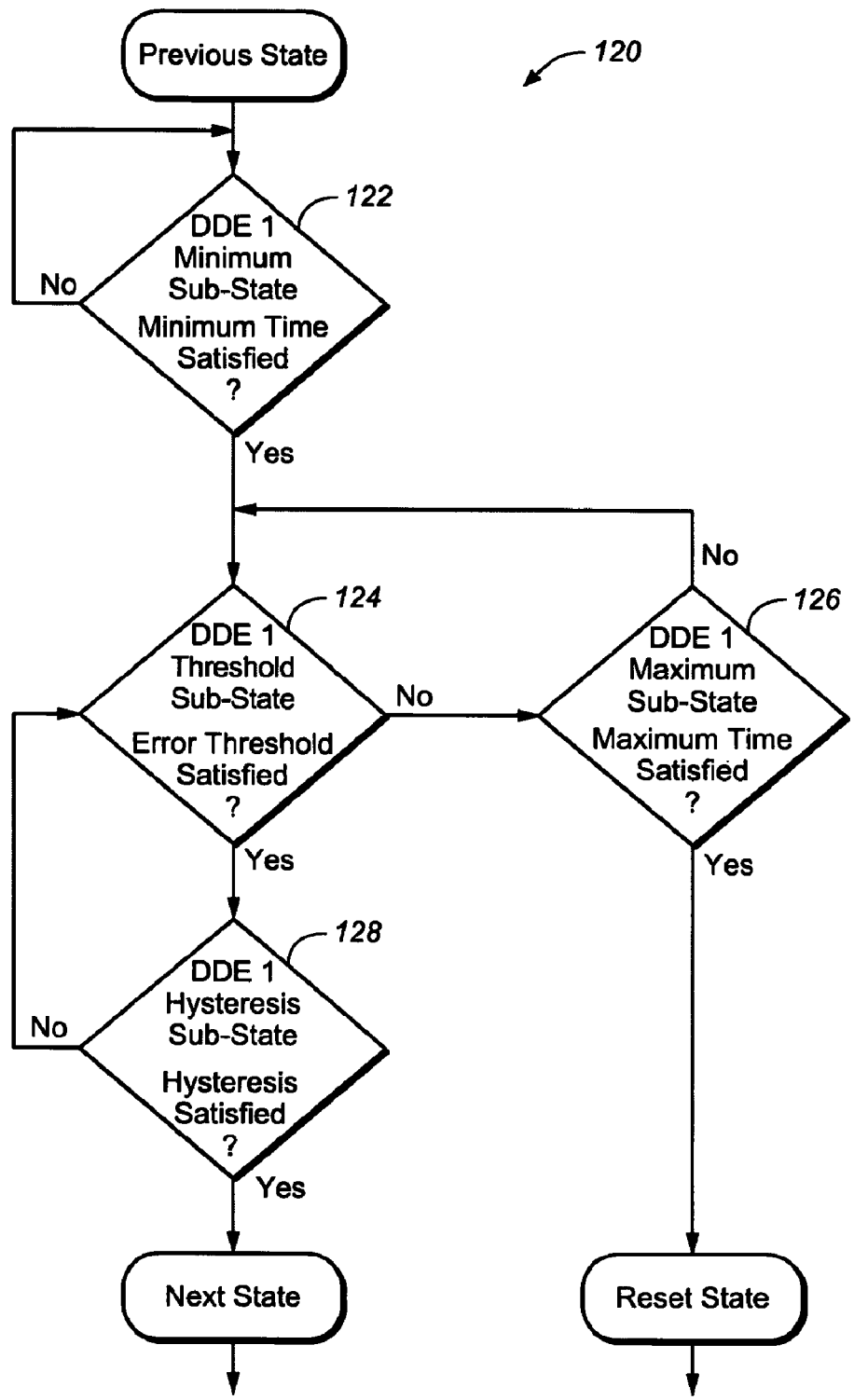
FIG. 8 depicts four loop tests for the State "7" of FIG. 1.

As shown in FIG. 8, the State "7" (26 of FIG. 1) includes four loop tests:

- The loop test 122 for the DDE1 Minimum Sub-State 26A (of FIG. 1):
  - Is minimum time satisfied?
- The loop test 124 for the DDE1 Threshold Sub-State 26B (of FIG. 1):
  - Is error threshold satisfied?
- The loop test 126 for the DDE1 Maximum Sub-State 26B1 (of FIG. 1):
  - Is maximum time satisfied?
- The loop test 128 for the DDE1 Hysteresis Sub-State 26C (of FIG. 1):
  - Is hysteresis satisfied?

In another embodiment of the present technology, the step (E) of performing the decision directed equalization (DDE) of the QAM signal causes the State machine to enter State "8" 28 (of FIG. 1) to perform the step of decision directed equalization (DDE) of the QAM signal. Briefly, during this State "8" the decision directed equalization is continued. The Equalizer coefficients are updated the same way as they were updated when the State machine was in State 7. But, the step size coefficients are readjusted for the State "8" for further refinement of the feedback error.

More specifically, in this embodiment of the present technology, the step of decision directed equalization (DDE) of the QAM signal while the State machine is in State "8" further comprises the step of re-adjusting the step size coefficient in the DDE algorithm to optimize the error feedback from the carrier loop to the equalizer. This step is fully disclosed in the referred above patent '098.

Figure 9:
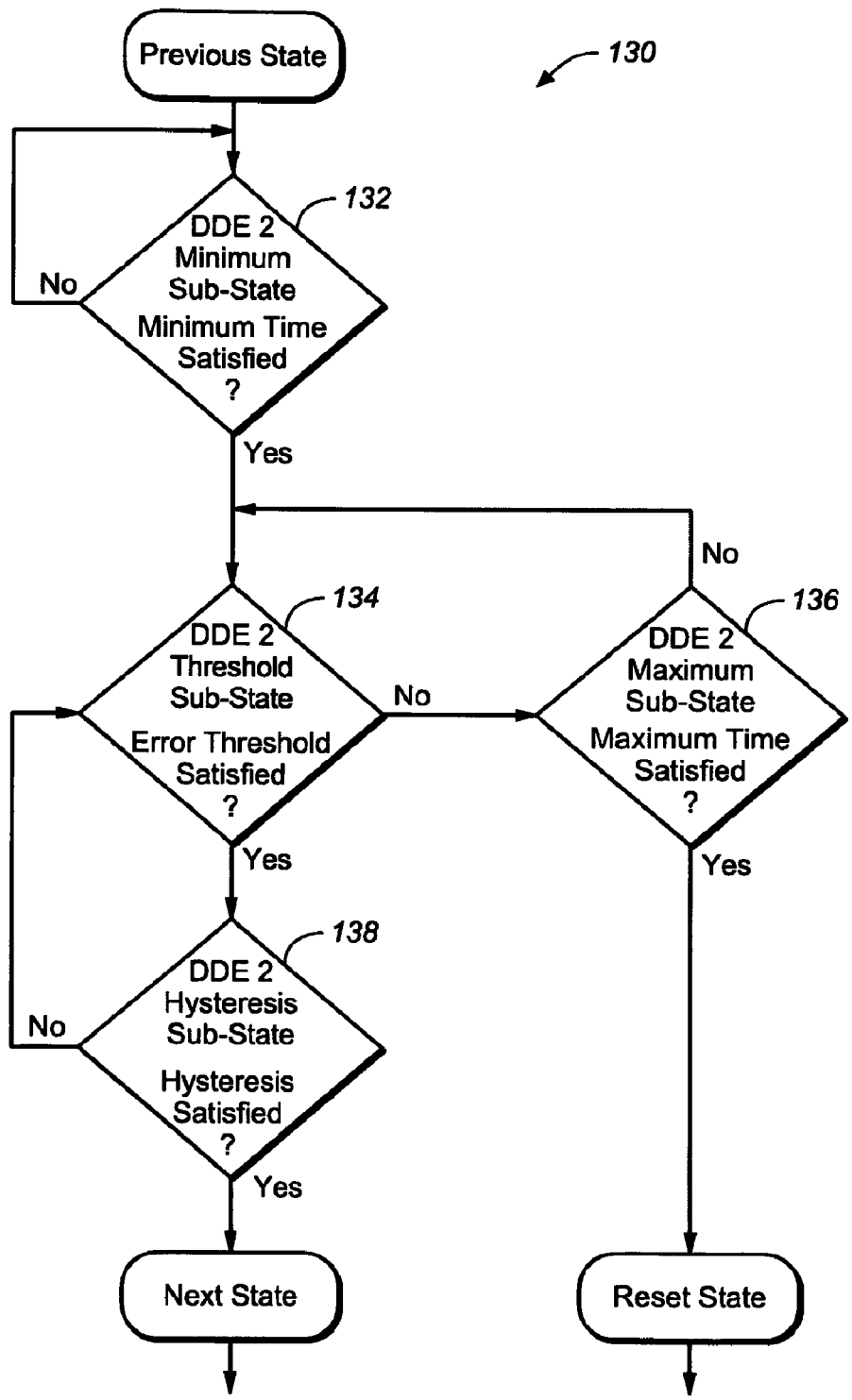
FIG. 9 shows four loop tests for the State "8" of FIG. 1.

As shown in FIG. 9, the State "8" (28 of FIG. 1) includes four loop tests:
- The loop test 132 for the DDE2 Minimum Sub-State 28A (of FIG. 1):
  - Is minimum time satisfied?
- The loop test 134 for the DDE2 Threshold Sub-State 28B (of FIG. 1):
  - Is error threshold satisfied?
- The loop test 136 for the DDE2 Maximum Sub-State 28B1 (of FIG. 1):
  - Is maximum time satisfied?
- The loop test 138 for the DDE2 Hysteresis Sub-State 28C (of FIG. 1):
  - Is hysteresis satisfied?

In one more embodiment of the present technology, the step (E) of performing the decision directed equalization (DDE) of the QAM signal causes the State machine to enter a tracking State "9" 30 (of FIG. 1) to perform the step of decision directed equalization (DDE) of the QAM signal.

In this embodiment of the present technology, the step of decision directed equalization (DDE) of the QAM signal while the State machine stays in State "9" further comprises the step of tracking the QAM signal by re-adjusting the step size coefficient in the DDE algorithm. This step is fully disclosed in the referred above patent '098.

Figure 10:
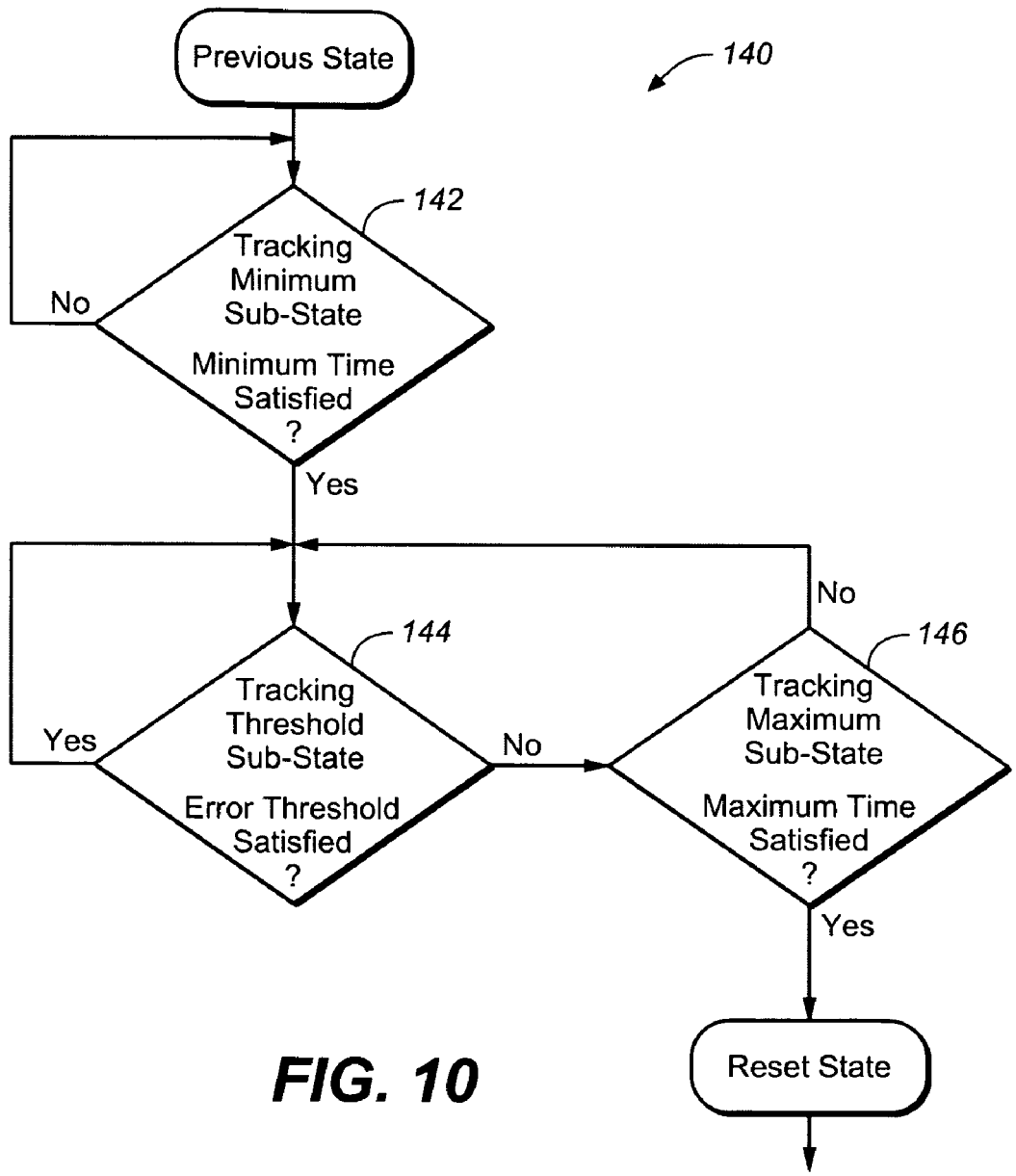
FIG. 10 illustrates three loop tests for the State "9" of FIG. 1.

As shown in FIG. 10, the State "9" (28 of FIG. 1) comprises three loop tests:
- The loop test 142 for the Tracking Minimum Sub-State 30A (of FIG. 1):
  - Is minimum time satisfied?
- The loop test 144 for the Tracking Threshold Sub-State 30B (of FIG. 1):
  - Is error threshold satisfied?
- The loop test 146 for the Tracking Maximum Sub-State 30B1 (of FIG. 1):
  - Is maximum time satisfied?

In an embodiment of the present technology, the algorithm employed by the State machine 11 (of FIG. 1) performs the additional step (F) of cycling the State machine 11 back to State "0" 12 to re-acquire a lost QAM signal. The modem also is automatically set to State 0 upon power up. During this State, all soft resets are asserted to zero-out all accumulators and filter delay lines.

For each State, there are control parameters that determine the State to State transition. More specifically, (a) Minimum Symbol Count determines the minimum number of symbols that is maintained per State, (b) Maximum Symbol Count determines the maximum number of symbols that is maintained per State, (c) error threshold parameter defines a limit to which the measured constellation error is compared, (d) dwell count parameter determines the number of symbols the error threshold should meet before allowing a State transition, (e) frequency sweep parameter allows the carrier recovery loop to search for frequency offsets beyond the carrier loop acquisition range, (t) coarse frequency parameter allows the front end carrier loop filter to remove frequency offsets due to slowly varying temperature and aging effects, and (g) AGC lock set parameter, Configuring the above parameters directly determines how quickly the modem acquires a signal or transitions from State to State. The modem requires that the minimum symbol count, the maximum symbol count, the error threshold, and the dwell count be set. However, the values assigned to these parameters can effectively bypass a State or reduce the amount of time the modem is in that State.

For instance, setting the minimum and maximum symbol count to zero allows the modem to bypass a State. Likewise, setting the error threshold to a low value and the dwell count to zero allows the modem to easily achieve the State conditions and continue with the next State. Practically, the values are dictated by the desired operating conditions and the type of signal to demodulate. The programmability of the modem gives the user a flexible means for achieving a signal acquisition.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of automated acquisition of a QAM signal said method employing a State machine progressing from an initial State to a final State; said State machine comprising: a symbol timing recovery loop; a carrier loop; a coarse frequency loop; and an equalizer; said method comprising:
   (A1) causing said State machine to enter a State AGC;
   (A2) performing a loop test for a AGC minimum Sub-State;
   (A3) performing a loop test for a AGC Lock Sub-State;
   (B) Performing a symbol timing recovery of said input QAM signal by adjusting a sampling clock of said symbol timing recovery loop;
   (C) Performing a Blind Equalization of said QAM signal without carrier lock to minimize a dispersion error of said received QAM signal constellation as compared with an error-free QAM signal constellation by adjusting a set of coefficients of said equalizer;
   (D) Performing a carrier recovery of said QAM signal to eliminate a residual carrier frequency error and to eliminate a phase error from said acquired QAM signal; and
   (E) Performing a decision directed equalization (DDE) of said QAM signal by updating a set of coefficients of said equalizer by using a decision based algorithm.

2. The method of claim 1, wherein said step (A2) of performing said loop test for said AGC minimum Sub-State further comprises:
   (A2, 1) performing a loop test for a AGC Coarse Estimation Sub-State.

3. The method of claim 1, wherein said step (A3) of performing said loop test for said AGC Lock Sub-State further comprises:
   (A3, 1) performing a loop test for a AGC Maximum Sub-State.

4. A method of automated acquisition of a QAM signal said method employing a State machine progressing from an initial State to a final State; said State machine comprising: a symbol timing recovery loop; a carrier loop; a coarse frequency loop; and an equalizer; said method comprising:
   (A) Performing an automatic gain control (AGC) operation on said incoming QAM signal to maintain a steady amplitude of said QAM signal;
   (B1) causing said State machine to enter a Clock 1 State;
   (B2) performing a loop test for a Clock 1 Minimum Sub-State;
   (B3) performing a loop test for a Clock 1 Maximum Sub-State;
   (C) Performing a Blind Equalization of said QAM signal without carrier lock to minimize a dispersion error of said received QAM signal constellation as compared with an error-free QAM signal constellation by adjusting a set of coefficients of said equalizer;

(D) Performing a carrier recovery of said QAM signal to eliminate a residual carrier frequency error and to eliminate a phase error from said acquired QAM signal; and (E) Performing a decision directed equalization (DDE) of said QAM signal by updating a set of coefficients of said equalizer by using a decision based algorithm.

5. The method of claim 4, wherein the method further comprises the steps of:
(B4) causing said State machine to enter a Clock 2 State;
(B5) performing a loop test for a Clock 2 Minimum Sub-State; and
(B6) performing a loop test for a Clock 2 Maximum Sub-State.

6. A method of automated acquisition of a QAM signal said method employing a State machine progressing from an initial State to a final State; said State machine comprising: a symbol timing recovery loop; a carrier loop; a coarse frequency loop; and an equalizer; said method comprising:
(A) Performing an automatic gain control (AGC) operation on said incoming QAM signal to maintain a steady amplitude of said QAM signal;
(B) Performing a symbol timing recovery of said input QAM signal by adjusting a sampling clock of said symbol timing recovery loop;
(C1) causing said State machine to enter a Blind State;
(C2) performing a loop test for a Blind Minimum Sub-State;
(C3) performing a loop test for a Blind Threshold Sub-State;
(C4) performing a loop test for a Blind Maximum Sub-State;
(C5) performing a loop test for a Blind Hysteresis Sub-State;
(D) Performing a carrier recovery of said QAM signal to eliminate a residual carrier frequency error and to eliminate a phase error from said acquired QAM signal; and
(E) Performing a decision directed equalization (DDE) of said QAM signal by updating a set of coefficients of said equalizer by using a decision based algorithm.

7. A method of automated acquisition of a QAM signal said method employing a State machine progressing from an initial State to a final State; said State machine comprising: a symbol timing recovery loop; a carrier loop; a coarse frequency loop; and an equalizer; said method comprising:
(A) Performing an automatic gain control (AGC) operation on said incoming QAM signal to maintain a steady amplitude of said QAM signal;
(B) Performing a symbol timing recovery of said input QAM signal by adjusting a sampling clock of said symbol timing recovery loop;
(C) Performing a Blind Equalization of said QAM signal without carrier lock to minimize a dispersion error of said received QAM signal constellation as compared with an error-free QAM signal constellation by adjusting a set of coefficients of said equalizer;
D1) causing said State machine to enter a Carrier 1 State;
(D2) performing a loop test for a Carrier 1 Minimum Sub-State;
(D3) performing a loop test for a Carrier 1 Threshold Sub-State;
(D4) performing a loop test for a Carrier 1 Maximum Sub-State;
(D5) performing a loop test for a Carrier 1 Hysteresis Sub-State; and
(E) Performing a decision directed equalization (DDE) of said QAM signal by updating a set of coefficients of said equalizer by using a decision based algorithm.

8. The method of claim 7, wherein said step (D4) of performing said loop test for said Carrier 1 Maximum Sub-State further comprises:
(D4, 1) performing a loop test for a Sweep Sub-State.

9. The method of claim 7, wherein the method further comprises the steps of
(D6) causing said State machine to enter a Carrier 2 State;
(D7) performing a loop test for a Carrier 2 Minimum Sub-State;
(D8) performing a loop test for a Carrier 2 Threshold Sub-State;
(D9) performing a loop test for a Carrier 2 Maximum Sub-State; and
(D10) performing a loop test for a Carrier 2 Hysteresis Sub-State.

10. A method of automated acquisition of a QAM signal said method employing a State machine progressing from an initial State to a final State; said State machine comprising: a symbol timing recovery loop; a carrier loop; a coarse frequency loop; and an equalizer; said method comprising:
(A) Performing an automatic gain control (AGC) operation on said incoming QAM signal to maintain a steady amplitude of said QAM signal;
(B) Performing a symbol timing recovery of said input QAM signal by adjusting a sampling clock of said symbol timing recovery loop;
(C) Performing a Blind Equalization of said QAM signal without carrier lock to minimize a dispersion error of said received QAM signal constellation as compared with an error-free QAM signal constellation by adjusting a set of coefficients of said equalizer;
(D) Performing a carrier recovery of said QAM signal to eliminate a residual carrier frequency error and to eliminate a phase error from said acquired QAM signal;
(E1) causing said State machine to enter DDE 1 State;
(E2) performing a loop test for a DDE 1 Minimum Sub-State;
(E3) performing a loop test for a DDE 1 Threshold Sub-State;
(E4) performing a loop test for a DDE 1 Maximum Sub-State; and
(E5) performing a loop test for a DDE 1 Hysteresis Sub-State.

11. The method of claim 10, wherein the method further comprises the steps of
(E6) causing said State machine to enter State DDE 2 State;
(E7) performing a loop test for a DDE 2 Minimum Sub-State;
(E8) performing a loop test for a DDE 2 Threshold Sub-State;
(E9) performing a loop test for a DDE 2 Maximum Sub-State; and
(E10) performing a loop test for a DDE 2 Hysteresis Sub-State.

12. The method of claim 11, wherein the method further comprises the steps of (E11) causing said State machine to enter a Tracking State;
(E12) performing a loop test for a Tracking State Minimum Sub-State;
(E13) performing a loop test for a Tracking State Threshold Sub-State; and
(E14) performing a loop test for a Tracking State Maximum Sub-State.

* * * * *